United States Patent Office 3,535,617
Patented Oct. 20, 1970

3,535,617
POWER SOURCE INCLUDING ALTERNATING CURRENT TRANSFORMER HAVING OUTPUT VOLTAGE ADJUSTABLE IN SMALL INCREMENTS
George G. Landis, Cuyahoga, Ohio, assignor to The Lincoln Electric Company, Cleveland, Ohio, a corporation of Ohio
Filed Feb. 2, 1968, Ser. No. 702,592
Int. Cl. H01f 29/02; H02m 7/04
U.S. Cl. 323—43.5                              12 Claims

ABSTRACT OF THE DISCLOSURE

A transformer rectifier type power source wherein the output voltage can be adjusted in increments less than the volts per turn of the output winding of the transformer. The end turn of the middle winding has taps which extend through the core itself. All the windings have taps which connect to a terminal board which can be interconnected by a common conductor plate to vary the output voltage of one secondary winding relative to the other. These voltages are combined through a conventional rectifier system.

Further, a Y-connected, three phase transformer has its secondary winding output taps connected to the input of a full wave rectifier. The windings have other taps to be selectively connected together so that the average output voltage of the rectifiers may be adjusted in amounts less than the volts per turn of the secondaries.

Further, each secondary has its taps brought out to terminals on a board so located that a single plate by appropriate positioning can complete the Y connection to selected interrelated taps whereby the maximum output voltage difference between windings is never more than the volts per turn.

---

This invention pertains to the art of alternating current power sources and more particularly to a power source wherein the voltage output may be varied by selecting appropriate taps on the secondary of an A.C. transformer.

The invention is particularly applicable to the art of power supplies using three phase transformers to energize an electric arc welding electrode through a full wave rectifier and will be described with particular reference thereto although it will be appreciated that the invention has broader applications and may be used with certain single phase transformers or with other transformers used for supplying DC electric energy for other purposes.

Electric transformers for energizing an electric arc welding electrode usually have voltage outputs adjustable from 15 to 60 volts at currents which may vary from a minimum of 50 amperes to a maximum of 1,000 amperes or even higher; 100 to 600 amperes is usual. These transformers are usually energizzed from the commercial three phase power lines at voltages sometimes at 110 volts but usually at 220 or 440 volts. The primary and secondary windings, depending on the k.v.a. rating, usually have more than two volts per turn for most economical construction. The secondary windings may be either Delta or Y connected to the input terminals of a full wave rectifier, the output of which is connected to the electrode and the workpiece. Such transformers usually have a constant voltage output with current variations.

Inasmuch as many arc welding processes of the constant voltage type require a rather critical adjustment of the voltage, there has been a problem in adjusting the output voltage of the transformer in sufficiently small increments to enable the exact desired voltage to be obtained.

It is known, of course, to tap the secondary of transformers but because the voltage between each turn of a high k.v.a. transformer is usually in excess of three volts, it will be seen that the minimum arc voltage variation obtainable is in such increments.

With multiphase transformers, it was always felt necessary to simultaneously change the taps on each phase winding so that the voltage output on each winding was the same.

It has been proposed to provide taps on the primary of the transformer thus obtaining increments for each turn change in the primary proportional to the step-down ratio of the transformer. However, this arrangement is considered undesirable because of the danger in working on the high voltage side of the transformer. Also, each change in the number of turns in the primary results in a different level of magnetic saturation in the transformer core.

Another method has been to provide a second transformer having a tapped secondary in series with the secondary of the principal transformer which has a lower voltage per turn in the secondary, which transformer, depending upon its phase relationship with the principal transformer will either add or subtract its voltage.

Still another method has been to provide a second transformer paralleling a portion of the secondary of the main transformer and having a large number of turns which are exposed so that a sliding contact can tap off very small increments in voltage to provide a fine adjustment to the coarse adjustments obtained by changing taps on the main transformer.

Both of these arrangements requiring a second transformer are relatively expensive and bulky.

The present invention contemplates a new and improved alternating current transformer having a core comprised of at least a center and a pair of outer legs with a bridging portion across the ends of the legs and wherein the secondary is tapped and the voltage between the individual taps is smaller than the volts per turn of the secondary.

In accordance with the present invention, the secondary on the center leg has an end turn with a plurality of taps thereon, at least one of which is connected externally of the transformer by means of a lead passing through the bridging portion of the core. Such transformer may be either single or multiphase. The voltage between these taps is less than the volts per turn of the secondary.

Further in accordance with the invention, a multiphase AC to DC power source is provided comprised of a rectifier having an input terminal for each phase and common positive and negative output terminals, a transformer having a multiturn secondary winding for each phase and each with a plurality of taps therealong, means connecting a tap on each winding to a respective input terminal on the rectifier and means interconnecting selectable taps on each winding with each other whereby the output voltage of each secondary winding may be adjusted relative to the other, the rectifier acting to average the voltage of the several windings such that output voltage variations less than the volts per turn of the transformer may be readily obtained.

"Taps" as used herein means a connection to a winding intermediate its ends or the connection to the end thereof which latter may sometimes be distinguished by referring to it as the "terminal tap" or "end tap."

The secondary winding on the center leg has one end turn with a plurality of fine voltage taps forming the output terminal thereof, at least one of the taps having a lead extending to the outside of the transformer through the bridging portion, all of the windings having a plurality of coarse voltage taps with one tap on each winding adapted to be connected to a tap on another winding to provide an interconnecting point of a Y connection. While the voltages between the output terminals and the selected taps may not be the same for each winding, such voltages are averaged through the rectifiers and by appropriately selecting taps, a variation of the output voltage can be obtained in relatively small increments.

Further in accordance with the invention, the coarse voltage taps on the windings are connected to terminals so located that a single shorting connector may interconnect coarse voltage taps on each winding such that the maximum voltage difference between the voltage of each winding is never greater than the volts per turn of the windings.

The principal object of the invention is the provision of a new and improved alternating current transformer having taps on the secondary so arranged that the output voltage of the transformer may be varied in increments less than the volts per turn of the secondary.

A further object of the invention is the provision of a new and improved transformer which can have its output voltage adjusted in increments less than the volts between each turn of the secondary wherein the adjustments are made on the secondary side of the transformer.

A further object of the invention is the provision of a new and improved multiphase welding power source the output voltage of which can be varied over rather wide limits in relatively small increments.

The invention may take physical form in certain parts and arrangement of parts, preferred embodiments of which will be described in detail in this specification and illustrated in the accompanying drawings which form a part hereof and wherein.

Figure 1:
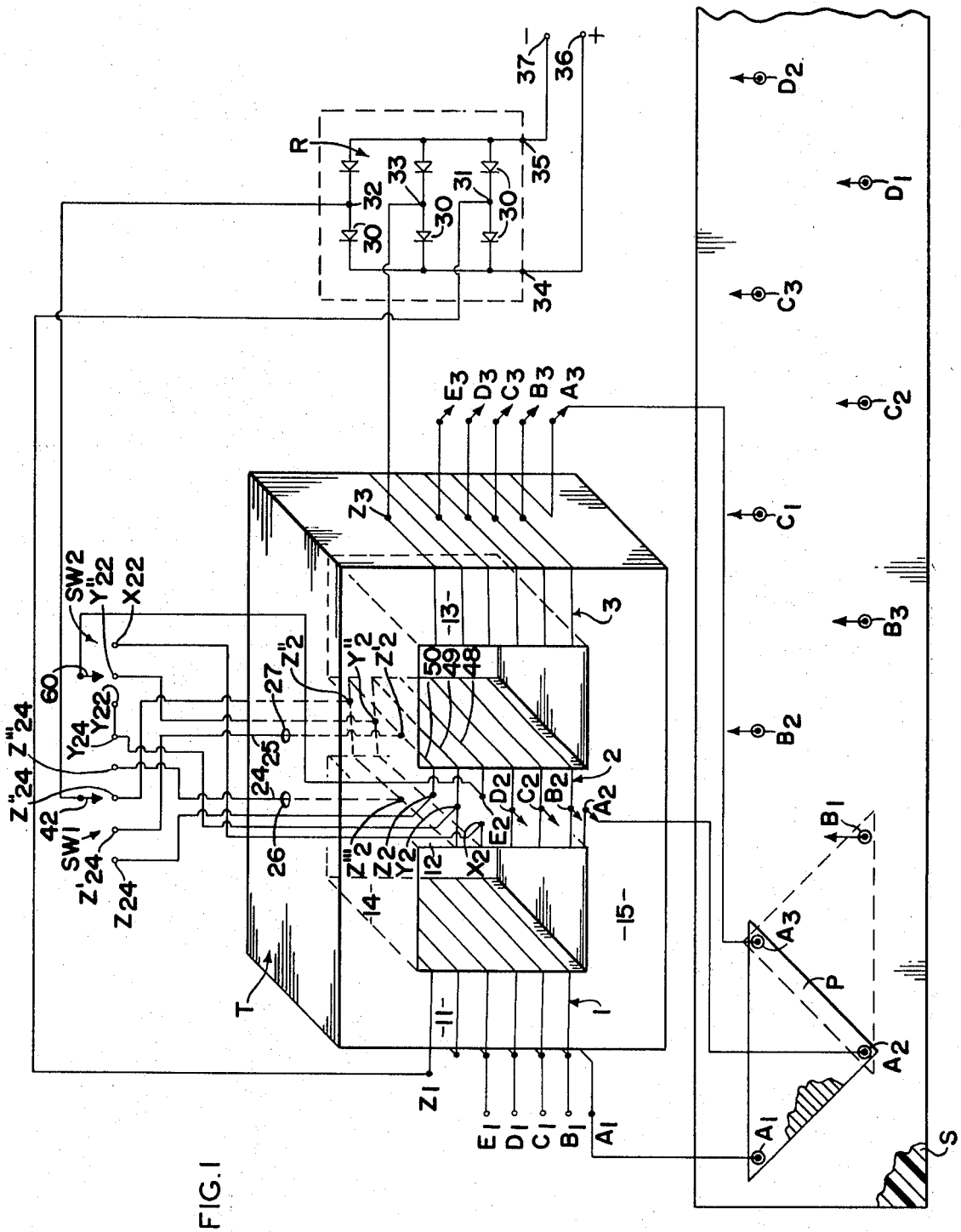
FIG. 1 is a partially schematic and partially perspective view of a power source illustrating a preferred embodiment of the invention.

Referring now to the drawings wherein the showings are for the purposes of illustrating a preferred embodiment of the invention only and not for the purposes of limiting same; FIG. 1 shows a transformer T for transforming the line voltage to the desired operating voltage, a rectifier R for changing the output of the transformer T to direct current, a terminal board S and cooperating shorting plate P for making rough adjustments on the output voltage and switches SW1 and SW2 for making fine adjustments on the output voltage.

The transformer T may be for any number of phases but in the embodiment shown is arranged for three phase alternating current and is comprised of a core having three spaced parallel legs 11, 12, 13 with the ends thereof magnetically interconnected by means of upper and lower bridge portions 14, 15. Each leg 11, 12, 13 has a primary winding thereon (not shown) and a secondary winding 1, 2, 3 respectively.

The core and its dimensions form no part of the present invention and are determined primarily by the k.v.a. rating of the transformer. The primary windings may have any number of turns as is conventional in economical transformer design dependent on the k.v.a. rating and the line voltage. The transformer of the preferred embodiment is rated at approximately 30 k.v.a. and is designed for 440 volts, three phase AC input. As such, each primary winding has 68 turns.

Each winding 1, 2, 3 represents one phase of the three phase transformer and each may be interwound with its corresponding primary or underneath or externally thereof as desired. The number of turns in each secondary winding 1, 2, 3 is preferably the same and will depend upon the desired voltage output of the transformer T. In the preferred embodiment, each secondary winding 1, 2, 3 is comprised of six turns at 3.9 volts per turn or 23.4 volts total across each winding. These windings are preferably Y-connected resulting in 40.5 volts RMS per phase or 57.3 volts peak.

Rectifier R is conventional and is comprised of six diodes 30 connected in a standard three phase bridge-type rectifier circuit having three input terminals 31, 32, 33 and common positive and negative output terminals 34, 35 which are connected respectively to the positive and negative terminals 36, 37 of the power supply. Terminal 31 connects to the upper end tap Z1 of coil 1 while terminal 33 connects to the upper end tap Z3 of coil 3. Terminal 32 connects to the arm 42 of selector switch SW1, the contacts of which as will be described hereinafter connect to appropriate taps on winding 2.

Each winding 1, 2, 3 has a lower end tap A and each turn thereabove has an intermediate tap indicated progressively upwardly as B, C, D and E with the taps for winding 1 being identified with the subscript 1, the taps for the winding 2 being identified with the subscript 2, and the taps for the winding 3 being identified with the subscript 3.

The terminal board S is comprised of a plurality of terminals arranged in two horizontal rows which terminals are identified with the particular taps on the windings 1, 2, 3 to which they are connected. The upper rows of terminals are all equally spaced in a horizontal direction while the lower row of terminals are located on a vertical plane midway between the upper terminals but at a distance such that the distance between an upper terminal and the closest lower terminal is different than the distance between adjacent terminals in the upper row. Two terminals of one row form an isosceles triangle with the adjacent terminal of the other row as distinguished from an equilateral triangle.

Reading from left to right and considering alternately the terminals in both rows, the left-hand terminal connects to tap A1, the second terminal (in the lower row) to tap A2, the third to A3, the fourth to B1, the fifth to B2, the sixth to B3 and so on such that there is one terminal for each of the taps A through E.

The shorting plate P is comprised of a flat sheet of copper having three openings therethrough such that these openings can be made to align with any three adjacent terminals thus interconnecting corresponding taps on the windings 1, 2 and 3, for example, terminals A1, A2, A3, in which case the windings 1, 2 and 3 will all have the same number of turns or the plate P may be inverted as is shown in dotted lines such that terminals A2, A3, and B1 are interconnected with the result that winding 1 has one less turn than that of windings 2 and 3. It is to be noted that no matter how the plate P is located, each winding will have either exactly the same number of turns as the others, or will have at most either one turn more or less than the others. These voltages are combined and averaged in the rectifier R as will appear.

It is believed that this arrangement for varying the voltage output of the secondary windings of a multiphase transformer is novel.

The adjustment of the position of plate P provides a coarse adjustment on the output voltage of the transformer. For the purpose of obtaining a fine adjustment, and in accordance with the invention, winding 2 is comprised of a principal winding of four turns and a supplemental winding of two turns 49 and 50. The top turn 50 has end tap Z2 and intermediate taps Z'2, Z"2, Z'"2, and Y2, which in the embodiment shown are spaced one from the other by one-fourth of a turn in a direction toward tap A2, it being noted that tap Y2 is spaced from end tap Z2 by one complete turn. Continuing from tap Y2, turn 49 has tap Y"2 spaced one-half turn therefrom which turn 49 terminates in end tap X2. The next turn 48 has its end tap E2 aligned with but insulated from terminal X2 and the winding then continues down in regular turns and is tapped as heretofore described at taps D2, C2, B2 and A2. Winding 2 thus has the same total number of turns as windings 1 and 3 but the top two turns 49 and 50 are separate from the remainder and are tapped as indicated. The taps on winding 49 are connected selectively to end tap E2 by means of selector switch SW2.

Thus, end tap E2 connects to the arm 60 of switch SW2. The three contacts of switch SW2 connect to the various taps on winding 2 which for the purposes of convenience are similarly lettered. Thus, tap X2 connects to contact X22, tap Y"2 connects to contact Y"22 and tap Y2 connects to contact Y22 as well as to contact Y24 of switch SW1. Tap Z'"2 connects to contact Z'"24, tap Z"2 connects to contact Z"24, tap Z'2 connects to contact Z'24 and end tap Z2 connects to contact Z24 of switch SW1.

In accordance with the invention, tap Z'"2 and tap Z'2 connect to their respective contacts by means of insulated leads 24 and 25 which, as shown, pass vertically upward through holes 26, 27 respectively in the bridge portion 14 of the core.

With this arrangement, the voltage difference between tap X2 and Y"2 is one-half of the volts per turn of the winding, such that by appropriately positioning arm 60 of switch SW2, the output voltage of the winding 2 can be adjusted in steps equal to one-half of the volts per turn of winding 2.

It will be further noted that the voltage difference from tap Z2 to tap Z'2 and from tap Z"2 to Z'2 is equal to one-fourth of the volts per turn of the winding 2.

In a like manner, the difference in the voltage between tap Z'"2 and Z"2 is equal to one-fourth of the volts per turn of the winding. By adjusting switch SW1, the voltage on its arm 42 can be varied in steps equal to one-fourth of the volts per turn.

Inasmuch as the voltage between each turn of the transformer of the preferred embodiment is 3.9 volts, the voltage difference between each contact of switch SW1 is 0.975 volt. This voltage difference is small enough that it can be switched under load with a relatively simple switch which forms no part of the present invention.

By appropriately positioning the contact plate P on the terminals of board S, a coarse voltage adjustment of 3.9 volts can be obtained across each winding by moving from one tap to the other. It will also be noted that since only three adjacent studs can be interconnected by plate P, the maximum voltage difference which can result between end taps Z1, Z2, Z3 is 3.9 volts.

In conventional three phase transformer rectifier combinations, the voltage differences between the three input terminals of the rectifier are always the same. In contradistinction to this, in accordance with the present invention, by appropriately selecting taps on each winding, the voltage between any pair of terminals can be adjusted so as to be different from that across the other two. The individual voltages are rectified and appear across the output terminals of the rectifier R as a pulsating DC voltage with certain peaks higher than others. These peaks can be leveled out by a suitable series inductance or parallel capacitance or both, if necessary. In any event, the DC voltage has an average value Vav which is effectively the output voltage of the power source.

Figure 2:
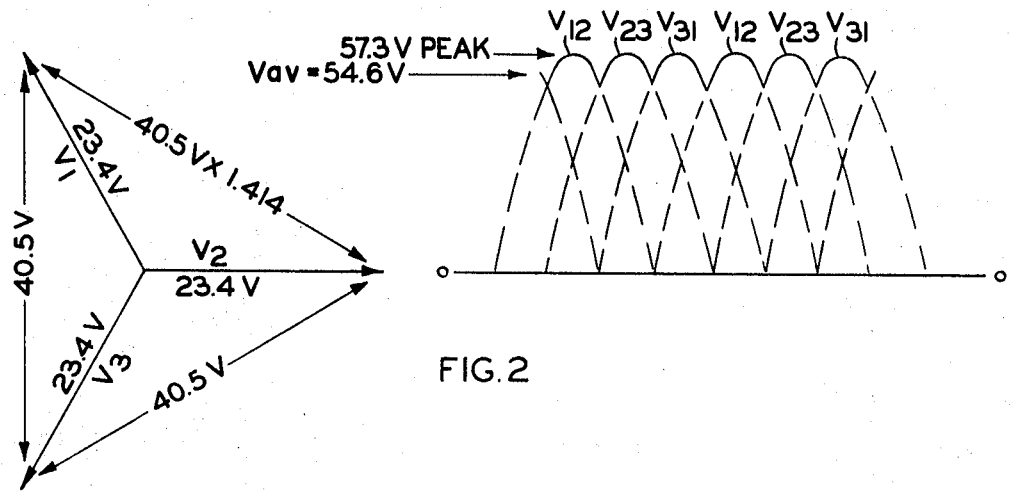
FIGS. 2, 3 and 4 are vector diagrams and voltage-time graphs showing the voltages across the individual secondary windings for various secondary windings as well as the average voltage output of the power source.
Figure 3:
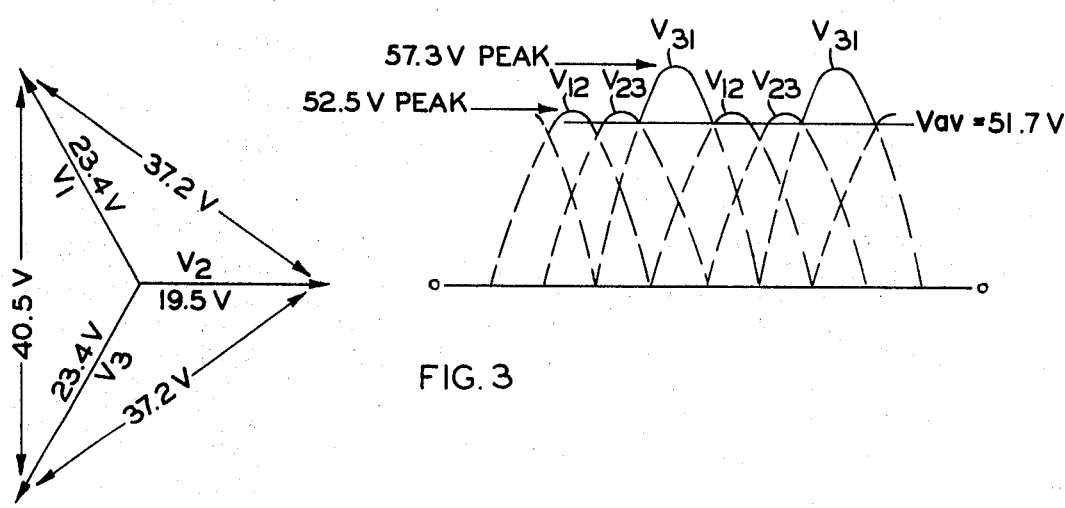
Figure 4:
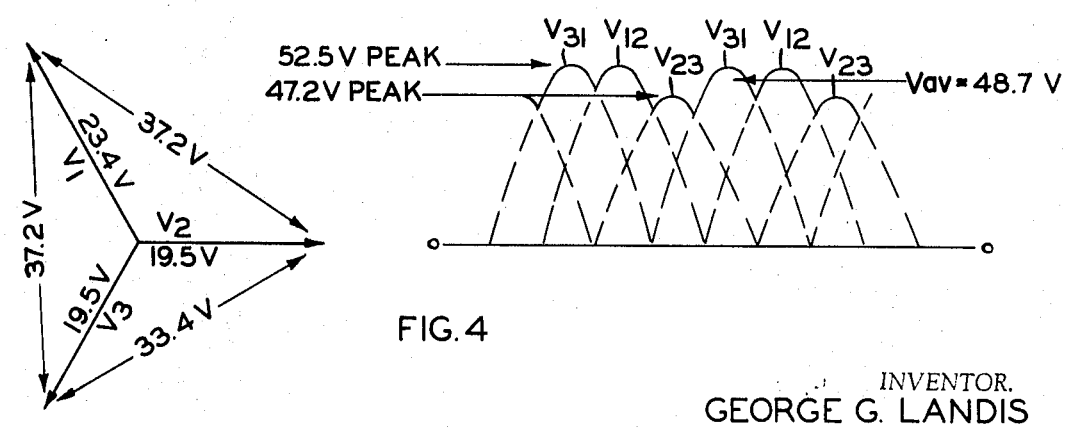

The results of the invention are shown graphically in FIGS. 2, 3 and 4 which show: vectors V1, V2, V3 representing the voltage and phase relationship of the voltage output across windings 1, 2, 3 for representative positions of plate P and switches SW1 and SW2; the peak voltages V12, V23, V31 applied to the rectifier terminals 31, 32, 33; and, the average value of the DC output voltage Vav of the rectifiers R considering the shape of the wave form.

FIG. 2 represents the situation when plate P is in the position shown in full lines in FIG. 1 and arm 42 of switch SW1 engages contact Z24 and arm 60 of switch SW2 engages contact X22. In this situation, there are a total of six turns in each secondary; V1, V2, V3 each equal 23.4 volts; and, V12, V23, V31 each equal 40.5 volts RMS or 57.3 volts peak. The average DC voltage output Vav of the rectifiers R is 54.5 volts.

FIG. 3 represents the situation when: (a) plate P is in the position shown in dotted lines in FIG. 1 and the switches are as indicated with reference to FIG. 2; or (b) plate P and switch SW1 are as above with reference to FIG. 2 and arm 60 of switch SW2 engages contact Y22; or, (c) plate P and switch SW2 are as indicated above with reference to FIG. 2 and SW1 engages contact Y24. In each of the above cases, two windings have six turns and one winding has five turns. In the case of (b) V1, V3 each equal 23.4 volts and V2 equals 19.5 volts. V31 equals 40.5 volts RMS, V12 and V23 each equal 37.2 volts RMS or 52.5 volts peak. Vav equals 51.7 volts.

FIG. 4 represents the situation when plate P and switches SW1 and SW2 are adjusted so that winding 1 has six turns and windings 2, 3 each have five turns. V1 equals 23.4 volts, V2, V3 each equal 19.5 volts. V12, V31 each equal 37.2 volts RMS or 52.5 volts peak. V23 equals 33.4 volts or 47.2 volts peak. The average voltage Vav is 48.7 volts.

By reducing the number of turns: first in one secondary winding by one turn; and, then in a second secondary by one turn; and, then in a third secondary by one turn, the output voltage Vav may be reduced from 54.8 volts to 51.7 volts to 48.7 volts to 45.0 volts respectively, i.e., about three volts for each turn reduced instead of the 9.3 volts if all the turns in each winding were reduced simultaneously by one turn as was done heretofore so as to keep the voltage of all the windings the same and the transformer in balance. If further rough adjustments of the voltage are desired, the contact plate P may be moved to engage the appropriate terminals.

Within this range of rough voltage variations, small increments of voltage variations up or down may be obtained by adjusting switch SW1, e.g., the output voltage Vav may be reduced in increments of approximately 0.78 volt for each position of switch SW1. Similarly, switch SW2 gives an adjustment of approximately 1.56 volts for each position.

The voltage output for various representative positions of the plate P and switches SW1 and SW2 may be tabulated as follows:

| Shorting plate connection | Position of SW2 | Position of SW1 | Vav |
|---|---|---|---|
| A1, A2, A3 | X22 | Z24 | 54.8 |
|  |  | Z'24 | 54.02 |
|  |  | Z"24 | 53.24 |
|  |  | Z'"24 | 52.46 |
|  |  | Y24 | 51.70 |
| A1, A2, A3 | Y'22 | Z24 | 53.24 |
|  |  | Z'24 | 52.46 |
|  |  | Z"24 | 51.70 |
|  |  | Z'"24 | 50.92 |
|  |  | Y24 | 50.14 |
| A1, A2, A3 | Y22 | Z24 | 51.70 |
|  |  | Z'24 | 50.92 |
|  |  | Z"24 | 50.14 |
|  |  | Z'"24 | 49.36 |
|  |  | Y24 | 48.58 |
| A2, A3, B1 | X22 | Z24 | 51.70 |
|  |  | Z'24 | 50.92 |
|  |  | Z"24 | 50.14 |
|  |  | Z'"24 | 49.36 |
|  |  | Y24 | 48.58 |

Obviously by moving the shorting plate so as to short other taps e.g., $C_2$, $C_3$, $D_1$; $B_1$, $B_2$, $B_3$; $D_3$, $E_1$, $E_2$; etc., other output voltages may be obtained which may be then adjusted in small increments by switches SW1 and SW2.

It will be appreciated that the fine voltage adjustments can only be obtained by taps on a winding on a center leg and that such tap must lead directly out through an opening in the bridging portion. The fine adjustment cannot be obtained on legs 11 or 13.

It will further be appreciated that this fine voltage adjustment can also be obtained on single phase transformers when the secondary winding is wound on the center leg of a shell-type core. With such single phase transformer it is not necessary to use a rectifier to combine the voltages.

The invention mal also be employed with two V connected secondary windings, one on a center leg.

Thus, using the present invention it is possible to provide a multiphase transformer having output terminals connected to the input terminals of a full-wave rectifier and by varying the output voltage of any one phase winding to obtain an incremental adjustment of the output voltage from the rectifier which is less than the voltage adjustment of the individual phase winding.

The power supply described herein has a relatively flat volt ampere curve and a relatively high short-circuit rate of current rise and is usable whenever such power supply characteristics are required. It will be appreciated that by proper design of the transformer or by the introduction of some inductance in the output circuit of the rectifiers R, the rate of rise of the current under short circuit conditions can be decreased so that the power supply acn be used as the principal power source in conjunction with a high rate of rise secondary power source as described in U.S. patent application, Ser. No. 652,204 filed July 10, 1967 and owned by the assignee of this application. Similarly the power supply of the present application with a high rate of rise can be used as the secondary power source of that earlier application.

Having described my invention, I claim:

1. An alternating current transformer having a core comprised of at least a pair of outer and a center leg and bridging portions linking the ends of said legs magnetically; a multiturn secondary winding on said center leg and having an end turn positioned around the periphery of said center leg, said end turn having an end tap and an intermediate tap spaced from said end tap a distance less than one-half of said turn and a connection from one of said taps extending through a passage located adjacent said tap in said bridging portion.

2. The transformer of claim 1 wherein said end turn has first, second and third intermediate taps approximately equally spaced between said end tap and a tap at the beginning of the second turn; and a connection from two non-adjacent taps each extending through an opening adjacent its respective tap in said bridging portion.

3. The transformer of claim 1 wherein each tap connects to a corresponding contact of a switch.

4. The transformer of claim 2 wherein a second turn has an end tap insulated from an end tap on the beginning of a third turn, said second turn having a tap midway between its beginning tap and its end tap; said three taps on said second turn being connected to the contacts on a selector switch, the selector arm of said switch being connected to the end tap of a third turn; said first turn end tap; said first, second and third taps and the tap at the beginning of the second turn being connected to the contacts on a selector switch, whereby the output voltage of said secondary winding may be varied in increments less than the voltage between each turn of the winding.

5. The transformer of claim 1 wherein said outer legs also have secondary windings thereon; each secondary winding having a tap adapted to be connected to the input terminals of a full-wave bridge rectifier means interconnecting other taps of said secondary windings into a Y connection; and means for varying the voltage across one of said windings relative to the voltage across the other of said windings whereby to vary the average output voltage of said transformer.

6. In combination with a multiphase transformer having three secondary windings each having one tap adapted to be connected to an input terminal of a multiphase full wave rectifier, said windings each having a plurality of other taps; means for interconnecting individually taps into a Y connection on said windings whereby the average output voltage of said transformer supplied to the three secondary winding taps can be varied in increments less than the volts per turn of the transformer.

7. The combination of claim 6 wherein said means includes terminal board having two rows of contacts with the contacts in each row equally spaced and the contacts in one row being equidistant from the adjacent contacts on the other row, said contacts from one end of said board being connected progressively to corresponding taps on said windings and in sequence from one end of the windings, and a shorting plate having means for interconnecting any three adjacent contacts in said two rows.

8. In combination with an adjustable voltage, power apparatus comprising a multiphase power transformer adapted to energize a multiphase bridge-type rectifier, said transformer having a multiturn secondary winding for each phase with each winding having a plurality of taps therealong; means adapted to connect one tap on each winding to a corresponding input terminal of said rectifier; other means connecting another tap on each winding with a tap on another winding whereby said windings are in Y connection; and means for changing the connection means to at least one tap on one of said windings to another tap on said one winding independently of the connection means to the taps on the other two windings whereby the output voltages of said windings may be varied independently of each other and the average output voltage of said transformer may be varied in an amount less than the volts between each turn of said secondary windings.

9. The power supply of claim 8 wherein a terminal board is provided comprised of two rows of terminals with the terminals in each row being equally spaced, one from the other, and the terminals in the second row forming an isosceles triangle with the two most adjacent terminals in the first row, said terminals in both rows consecutively in one direction being connected to corresponding and consecutive taps of said secondary windings, a shorting bar arranged to contact any two adjacent terminals in one row and the closest adjacent terminal in the other row, said shorting bar, by appropriate positioning interconnecting taps on each secondary winding such that the maximum voltage difference between each secondary winding is never greater than the volts per turn of the transformer.

10. The power supply of claim 8 wherein said transformer is comprised of a core having a center and two end legs and bridging portions for the ends of said legs, a secondary winding on each leg, an end turn on the center leg winding having four taps spaced approximately equal, two of said taps each having a connection which passes externally of said transformer through a passage in said bridging portion.

11. The power source of claim 10 wherein said taps connect to the contacts of a selector switch, and a selector arm for selectively engaging said contacts, said arm being connected to a terminal of said rectifier.

12. The power source of claim 10 wherein said winding includes a second turn having an end tap insulated from the end tap of the third turn and a tap spaced approximately one-half turn therefrom and means for selectively connecting said third turn end tap to said second turn taps.

References Cited

UNITED STATES PATENTS

| | | | |
|---|---|---|---|
| 1,928,681 | 10/1933 | Beling | 323—43.5 X |
| 2,369,038 | 2/1945 | Garin | 323—43.5 X |
| 3,089,074 | 5/1963 | Vaughan | 321—24 X |
| 3,132,318 | 5/1964 | Kiltie | 336—172 |
| 3,316,381 | 4/1967 | Gibson. | |

FOREIGN PATENTS

| | | |
|---|---|---|
| 575,214 | 2/1946 | Great Britain. |
| 680,508 | 9/1939 | Germany. |

J D MILLER, Primary Examiner

W. H. BEHA, Jr., Assistant Examiner

U.S. Cl. X.R.

219—131; 321—5, 24; 336—10, 150, 172